(12) United States Patent
Sum

(10) Patent No.: US 10,457,084 B2
(45) Date of Patent: Oct. 29, 2019

(54) ANTI-OFF AND REPLENISHED STICKY NOTES WITH MAGNETIC CHASSIS WHICH CAN BE SLID AND PLACED ERECTLY ON METAL PLANE

(71) Applicant: Lik Hang Alex Sum, Hong Kong (HK)

(72) Inventor: Lik Hang Alex Sum, Hong Kong (HK)

( * ) Notice: Subject to any disclaimer, the term of this patent is extended or adjusted under 35 U.S.C. 154(b) by 0 days.

(21) Appl. No.: 15/945,278

(22) Filed: Apr. 4, 2018

(65) Prior Publication Data

US 2018/0304665 A1      Oct. 25, 2018

(30) Foreign Application Priority Data

Apr. 19, 2017   (HK) .................................. 17103987.0

(51) Int. Cl.
| | |
|---|---|
| *A47G 1/17* | (2006.01) |
| *B42D 5/00* | (2006.01) |
| *F16M 13/02* | (2006.01) |
| *F16B 1/00* | (2006.01) |

(52) U.S. Cl.
CPC ............... *B42D 5/005* (2013.01); *F16B 1/00* (2013.01); *F16M 13/022* (2013.01); *F16B 2001/0035* (2013.01)

(58) Field of Classification Search
CPC .......... B42D 5/005; F16M 13/022; F16B 1/00
USPC .................................... 248/206.5, 683, 309.4
See application file for complete search history.

(56) References Cited

U.S. PATENT DOCUMENTS

2015/0114856 A1*   4/2015   Raymond ............ B43M 99/009
                                                        206/214

FOREIGN PATENT DOCUMENTS

WO         WO-0125023 A1 *   4/2001    ............. B42D 5/005

* cited by examiner

*Primary Examiner* — Todd M Epps
(74) *Attorney, Agent, or Firm* — Muncy, Geissler, Olds & Lowe, P.C.

(57) ABSTRACT

A reusable anti-falling magnetic base capable of sliding and standing on a magnetic plane for sticky notes is provided, hereinafter called sticky note-connected magnetic base or magnetic base, which belongs to the field of stationery supplies and mainly aims to solve the problems in the prior art that during use, self-adhesive glue is easy to fail and the paper sticky notes may fall off and curl up at the corns. According to the present invention, the sticky note-connected magnetic base may easily slide and move on and remove from the magnetic plane, and may fix and stand obliquely on the magnetic plane for point-and-selection use. When used in a whole, the sticky notes can easily appear in steric list arrangement and keep more neat and organized, and provide a good hand-feeling as compared with the conventional sticky notes.

8 Claims, 8 Drawing Sheets

[Figure 1A]
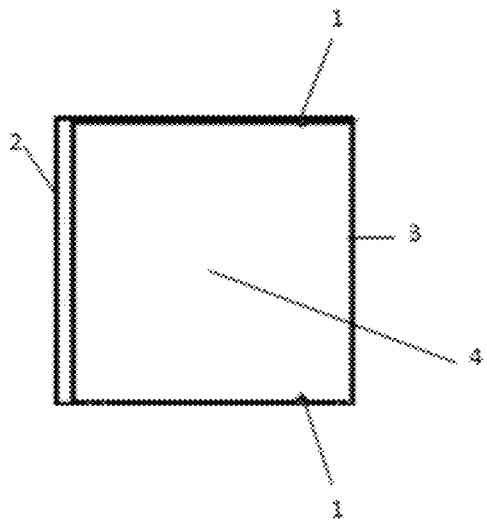
[Figure 1 B]
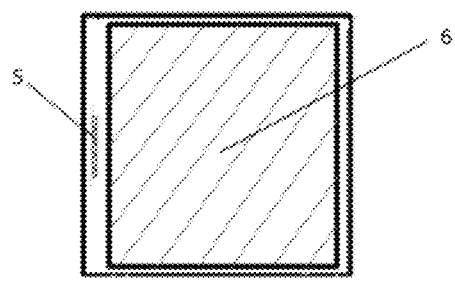
[Figure 1 C]
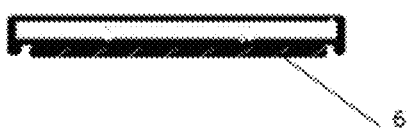
[Figure 1 D]
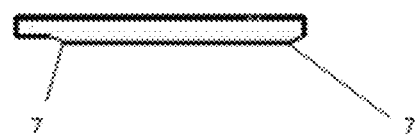

[Figure 1 E]
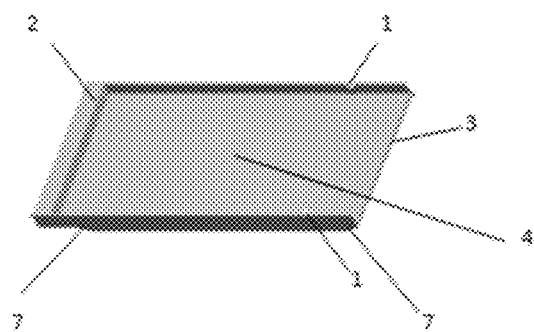
[Figure 2]
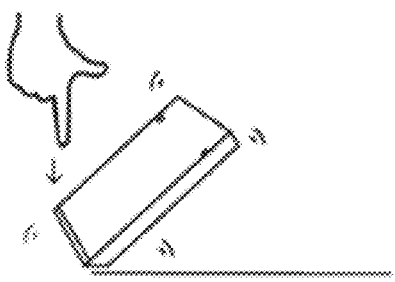

_(12) United States Patent US 10,457,084 B2_

ANTI-OFF AND REPLENISHED STICKY NOTES WITH MAGNETIC CHASSIS WHICH CAN BE SLID AND PLACED ERECTLY ON METAL PLANE

TECHNICAL FIELD

The present invention relates to a stationery product, in particular to a sticky notes base for improving a using method of the conventional sticky notes.

BACKGROUND ART

With the widespread use of sticky notes over the past decades, there is a need for improving both quality and function of sticky notes in either education and culture industry and office supplies industry. Although mobile phones are very popular, sticky notes designed for real-time information record are still widely used due to small size and convenience for carrying, in people's work, study and even a 'brainstorming' thinking process, However, for the conventional sticky notes, the self-adhesive glue is provided on only one side edge, and the paper sticky notes may curl up at the corn and the self-adhesive glue may not work after long-term exposure to air, causing the falling-off of the paper sticky notes, which leads to waste and irregular layout and produces an adverse effect on operation. Also, the conventional sticky notes provide a bad hand-feeling when in use. In recent years, static sticky notes are available in the market, which help solve the problem of curling-up at the corn. However, static sticky notes fail to prevent from falling-off and provide a good hand-feeling.

SUMMARY OF THE INVENTION

An object the prevent invention is to provide a sticky notes base for improving a using method of the conventional sticky notes. When the sticky notes base is used with sticky notes, after long-term exposure to air, the paper sticky notes do not curl up at the corns and self-adhesive glue works, thereby preventing the paper sticky notes from falling off, and the sticky notes keep neat and organized to provide aesthetic appearance and have a good hand-feeling. Regarding to the improvement of hand-feeling, the magnetic base, used with the sticky notes, can slide on and obliquely stand and fix on a magnetic surface (such as a whiteboard), and the sticky notes are prevented from falling off, which can improve user's experience. After a pile of sticky notes is used up, another one is replaced while the magnetic base is reusable.

In order to solve the technical problems, the present invention adopts the technical solution as follows: a reusable anti-falling magnetic base capable of sliding and standing on a magnetic plane for sticky notes comprises a magnetic base, and is characterized in that the magnetic base comprises, at the bottom, magnet sheets and holes for holding small magnets. Bumps are arranged at the side rims of the magnetic base. The portions of the magnetic base side rims wrapping the magnet sheets are provided with an oblique angle.

The present invention has the following benefits: the magnetic base is provided with the bumps for clamping the sticky notes to fix on the magnetic base, thereby preventing the sticky notes from falling off. The magnetic base is provided with the magnet sheets and holes for holding small magnets, so that the magnetic base together with the sticky notes is absorbed on a magnetic plane (such as a whiteboard) and can slide and move on and remove from the magnetic plane and can fix and stand obliquely on the plane for easy press and pickup use. When used in a whole, the sticky notes can easily appear in steric list arrangement and keep more neat and organized, and provide a good hand-feeling as compared with the conventional sticky notes.

BRIEF DESCRIPTION OF THE DRAWINGS

FIG. 1(A) is a top view of a reusable anti-falling magnetic base capable of sliding and standing on a magnetic plane for sticky notes in accordance with an example of the invention;

FIG. 1(B) is a top view of the bottom of a reusable anti-falling magnetic base capable of sliding and standing on a magnetic plane for sticky notes in accordance with an example of the invention;

FIG. 1(C) is a side view of the left edge of a reusable anti-falling magnetic base capable of sliding and standing on a magnetic plane for sticky notes in accordance with an example of the invention;

FIG. 1(D) is a side view of the lower edge of a reusable anti-falling magnetic base capable of sliding and standing on a magnetic plane for sticky notes in accordance with an example of the invention;

FIG. 1(E) is a perspective view of a reusable anti-falling magnetic base capable of sliding and standing on a magnetic plane for sticky notes in accordance with an example of the invention;

FIG. 2 shows a reusable anti-falling magnetic base capable of sliding and standing on a magnetic plane for sticky notes in a hand-press standing state, in accordance with an example of the invention;

In the figures: 1 bump, 2 protruding rim portion, 3 open-type rim-free portion, 4 magnetic base surface, 5 hole for holding small magnet, 6 magnet sheet, 7 oblique portion of side rims wrapping magnet sheet, and 8 sticky notes.

DETAILED DESCRIPTION OF THE INVENTION

Regarding the technical solution adopted to achieve the object of the invention, a reusable anti-falling magnetic base capable of sliding and standing on magnetic plane for sticky notes of the present invention is described in details herein with reference to the embodiments shown in FIGS. 1A to 4E.

The invention provides a sticky notes base for improving the using method of the conventional sticky notes. For the conventional sticky notes, when in use, a user writes on the uppermost one of a pile of sticky notes and then posts it on a to-be-attached surface for labeling, alternatively, a user takes the uppermost one of a pile of sticky notes and then writes on it and finally posts it on a to-be-attached surface for labeling. The technical solution adopted by the invention is as follows: a pile of sticky notes is received in the magnetic base and used together, so as to solve the problems that the sticky notes are prone to fall off, have a bad hand-feeling, fails to keep neat and organized, and lacks the functions of sliding and point-and-selection.

Figure 3:
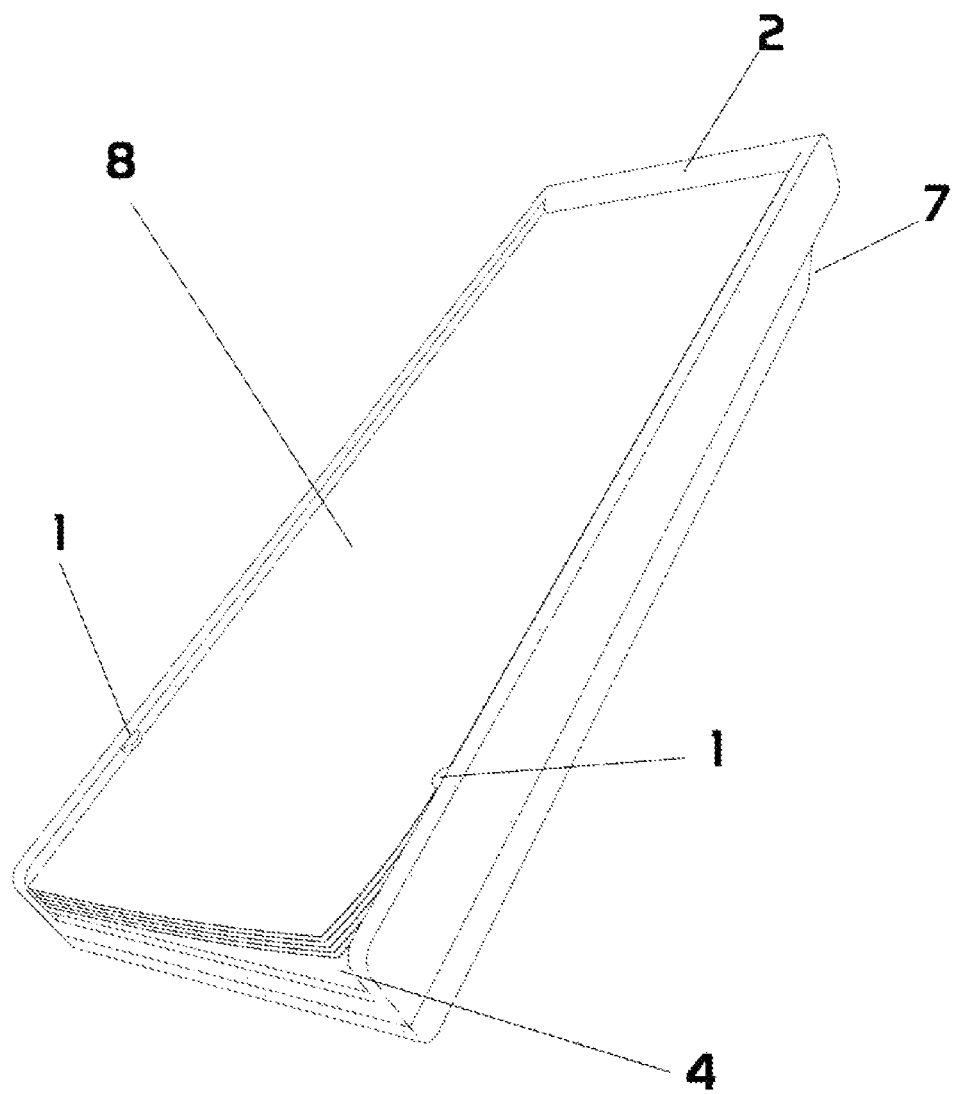
FIG. 3 shows a perspective view of the anti-falling magnetic base accommodating a pile of sticky notes in accordance with an example of the invention.

A pile of sticky notes (8), having the same size as a base surface (4), is received in the magnetic base surface (4), the thickness of the sticky notes (8) not exceeding the thickness from the magnetic base surface (4) to the top of a protruding rim portion (2), then the pile of sticky notes (8) is positioned by bumps (1), which, in combination with the self-adhesive glue of the sticky notes (8), can prevent the sticky notes (8) from falling off (as shown in FIG. 3). After that, a user can write on the sticky notes (8) connected in the magnetic base and then attach to a magnetic surface (such as a whiteboard). The uppermost sticky note (8) can be removed and thrown off after it is not used any more, and then the next one is presented to allow the user to write, which is repeated until the whole pile of sticky notes (8) is used up. (See FIG. 1A)

After the whole pile of sticky notes is used up, another pile of sticky notes is connected to the magnetic base surface (4) for continuous use. (See FIG. 1A)

An open-type rim-free portion (3) is designed to facilitate the removal of the uppermost sticky note. (See FIG. 1A)

The magnetic base is designed in a rectangular shape such that multiple magnetic bases can be regularly arranged in a sealed manner for list arrangement use, without occupying much room of the magnetic surface (such as a whiteboard). (See FIG. 1A)

The magnetic base is provided at the bottom with magnet sheets (6) and holes (5) for holding small magnets, so that the sticky notes connected in the magnetic base can stably attached to the magnetic surface (such as a whiteboard), alternatively, the sticky notes connected in the magnetic base can slide and move on the magnetic surface (such as a whiteboard). (See FIG. 1B)

Figure 4A:
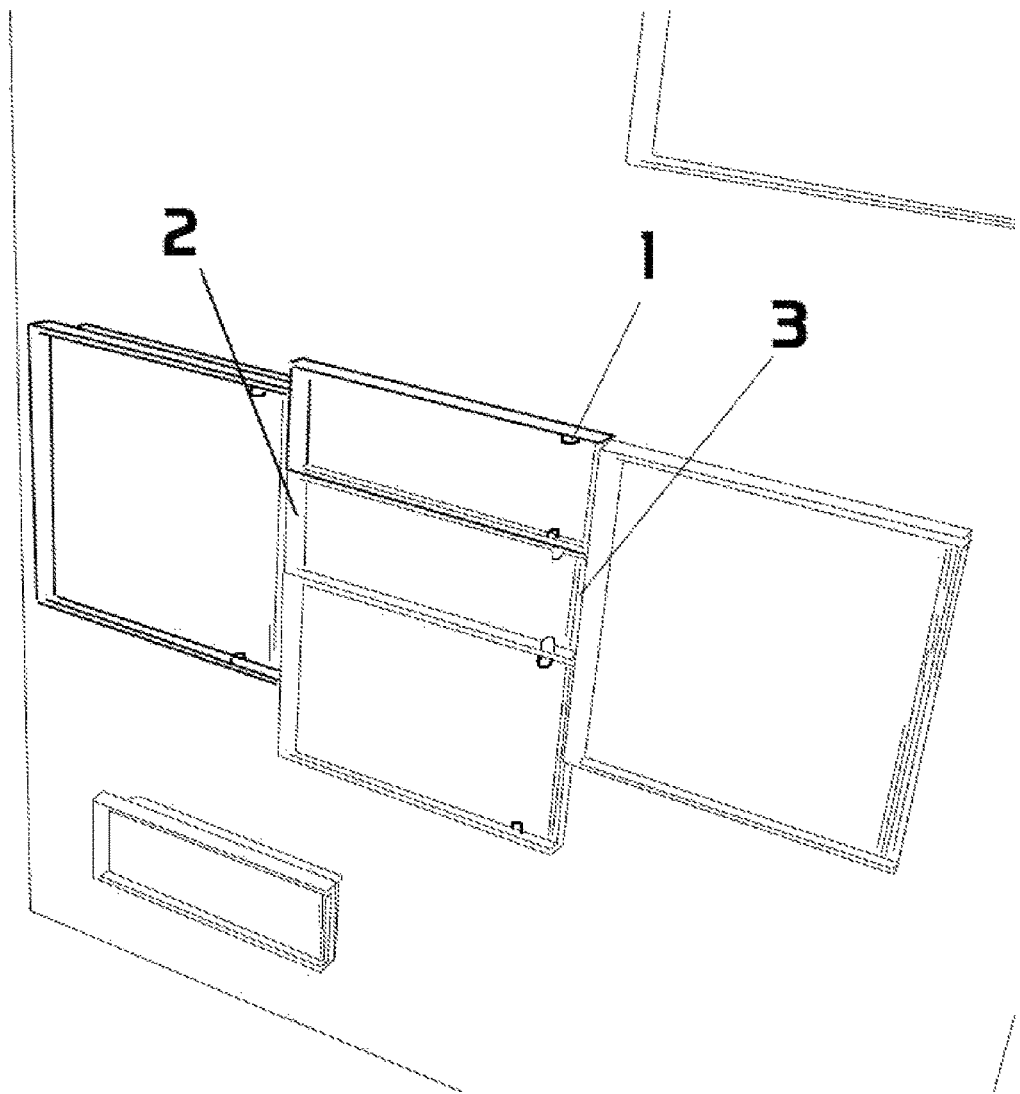
FIG. 4A-4E show a series of perspective views to illustrate the operations of the anti-falling magnetic base and easy press and pickup in accordance with an example of the invention.
Figure 4B:
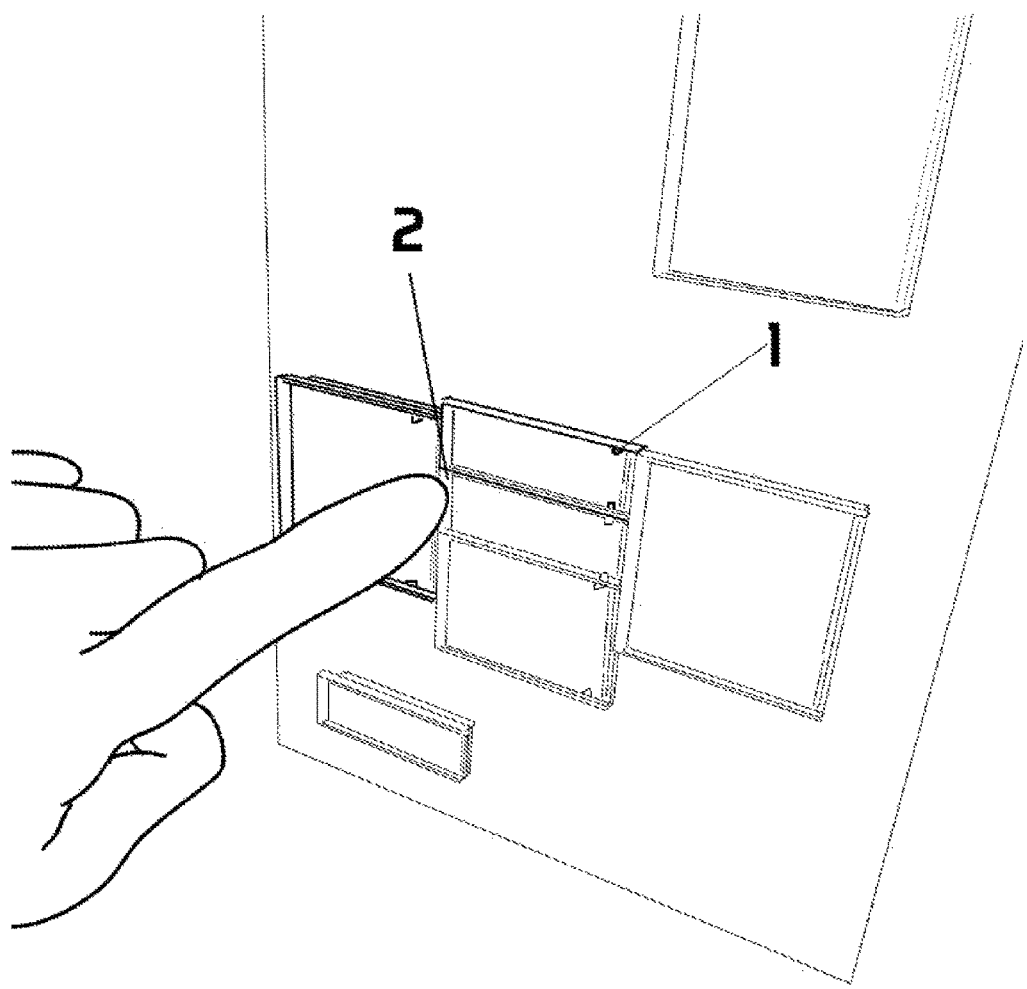
Figure 4C:
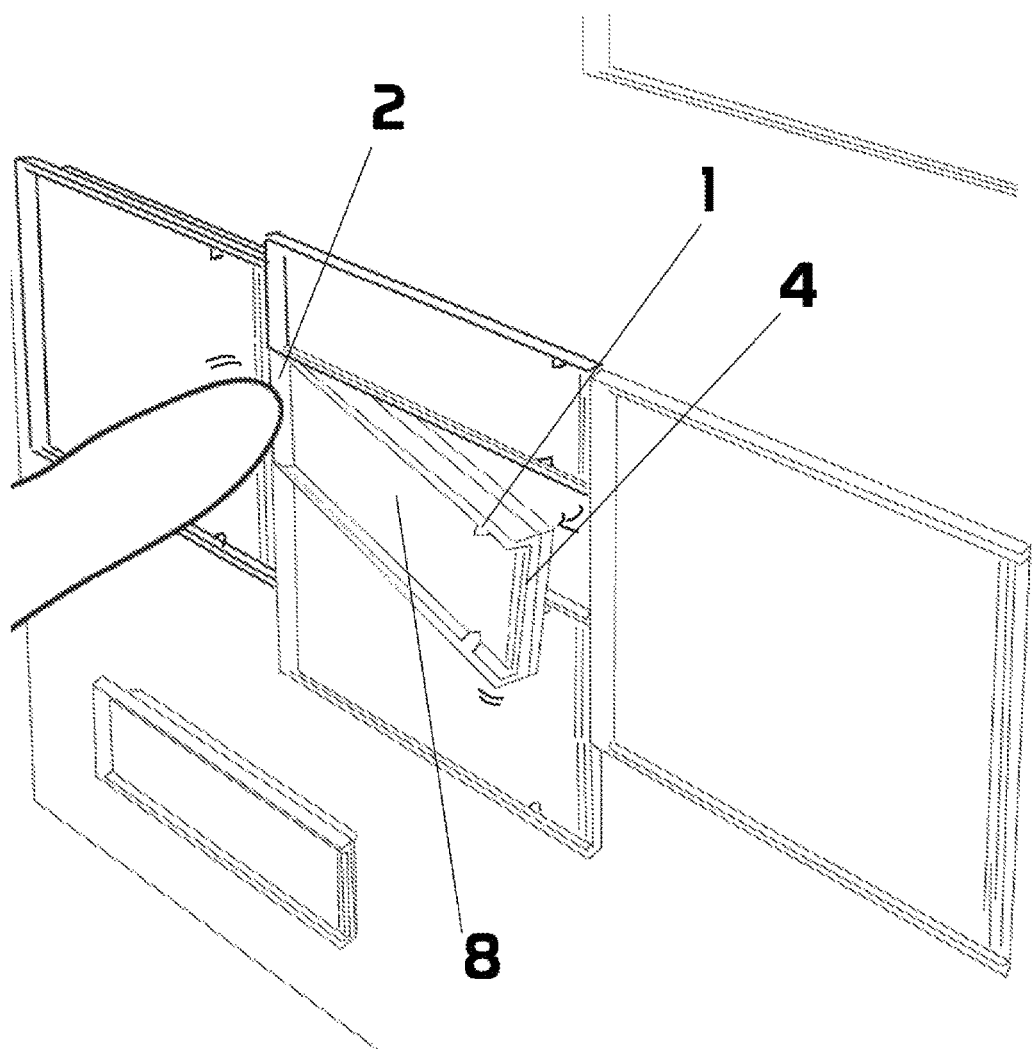
Figure 4D:
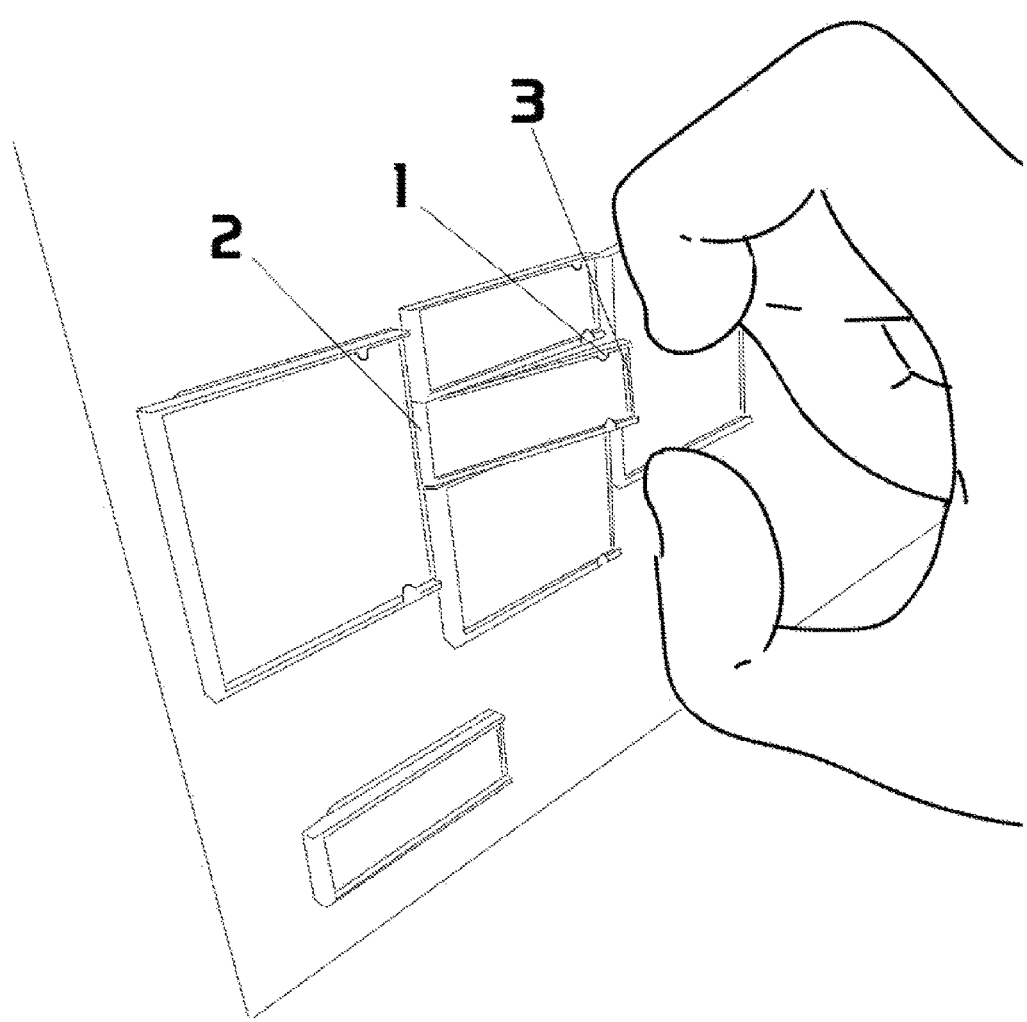
Figure 4E:
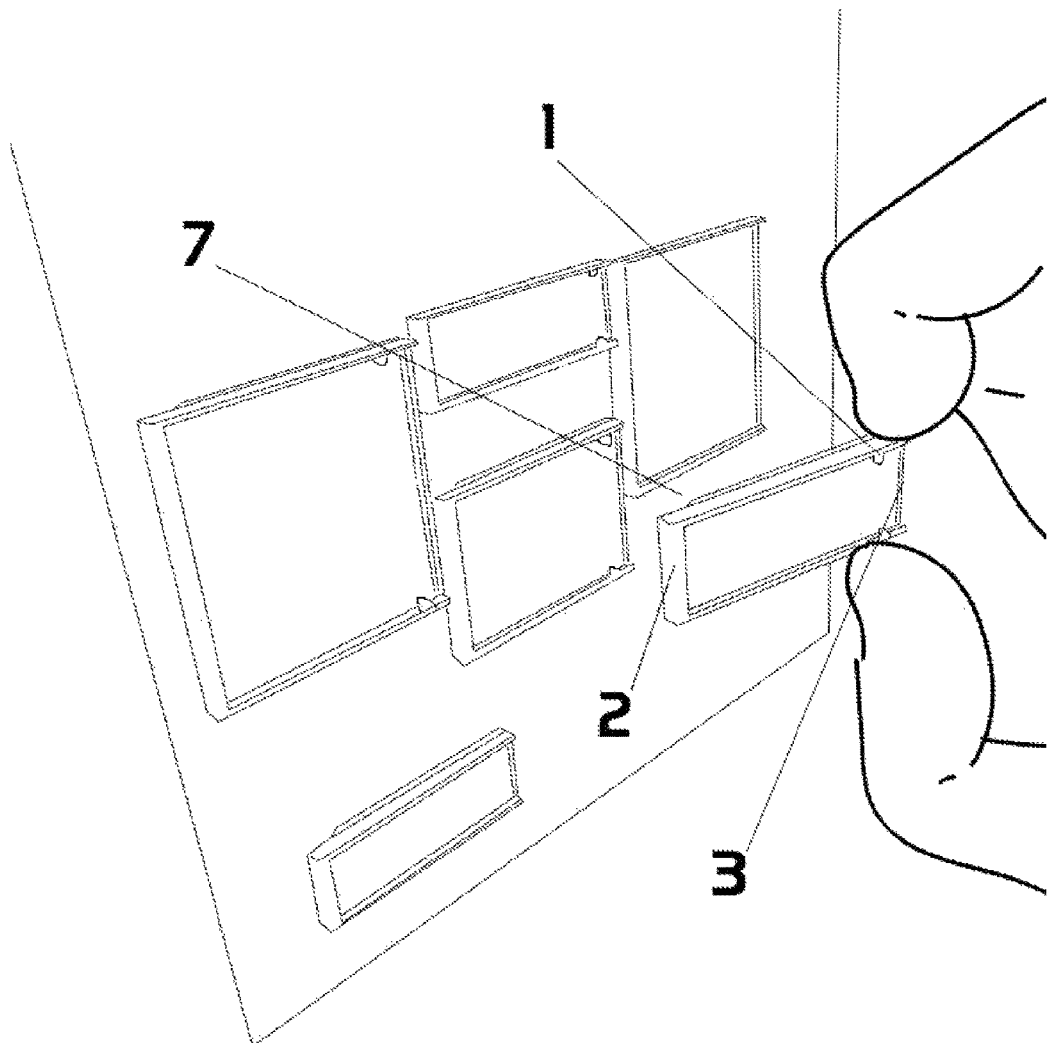

The magnet sheets (6) at the bottom of the magnetic base are configured to reserve a predetermined space and keep a small distance from the holes (5) for holding small magnets, and the portions of the upper and lower rims wrapping the magnet sheets are provided with an oblique angle (7). FIGS. 4A-4E show the series operations of the magnetic base. In FIG. 4A, the magnetic base surface (4) of the magnetic base is attached on a magnetic surface (such as a whiteboard) as a default position. In FIG. 4B, a finger of the user presses at the left protruding rim portion (2). In FIG. 4C, as a result of the press by the finger, the closely surrounded magnetic base stands or pops up from the side of a protruding rim portion (2) and remains in that position (i.e., at an oblique angle on the magnetic surface) independently. FIG. 4D illustrates that the user purports to pick up the standing magnetic base. In FIG. 4E, the standing magnetic base has been picked up and removed from the magnetic surface without distortion to other bases' position. Such design allows the user to press down the protruding rim portion (2) when the sticky notes connected in the magnetic base lies on the magnetic surface (such as a whiteboard), so that the sticky notes connected in the magnetic base can stand and fix at an oblique angle on the magnetic surface (such as a whiteboard) to provide the point-and-selection use and provide enough room to allow the user to take off the sticky notes connected in the magnetic base, and the obliquely-standing effect is particularly significant for multiple magnetic bases which are arranged in a sealed manner. In summary, the preferred embodiments of the present invention are merely illustrative and not intended to limit the scope of the invention. Any changes and modifications made in connection with the scope of the present invention are intended to be embraced therein.

The invention claimed is:

1. A reusable anti-falling magnetic base capable of sliding and standing on a magnetic plane for sticky notes, comprising a magnetic base, and characterized in that the magnetic base comprises, at a bottom of the magnetic base, magnet sheets holes for holding small magnets; wherein portions of side rims of the magnetic base are provided with an oblique angle; whereby the sticky notes connected in the magnetic base stand and fix at the oblique angle on a magnetic surface.

2. The reusable anti-falling magnetic base capable of sliding and standing on a magnetic plane for sticky notes according to claim 1, characterized in that a small distance is kept between the magnet sheets at the bottom of the magnetic base and the holes for holding small magnets at the bottom of the magnetic base.

3. The reusable anti-falling magnetic base capable of sliding and standing on a magnetic plane for sticky notes according to claim 1, characterized in that bumps are arranged at the side rims of the magnetic base.

4. The reusable anti-falling magnetic base capable of sliding and standing on a magnetic plane for sticky notes according to claim 1, characterized in that an area of the magnet sheets at the bottom of the magnetic base is identical to an area of the bottom of the magnetic base.

5. The reusable anti-falling magnetic base capable of sliding and standing on a magnetic plane for sticky notes according to claim 1, characterized in that a protruding rim portion of the magnetic base is wider than the side rims of the magnetic base.

6. The reusable anti-falling magnetic base capable of sliding and standing on a magnetic plane for sticky notes according to claim 1, characterized in that the side rims of the magnetic base wrap sides of the magnet sheets and a small pile of sticky notes.

7. The reusable anti-falling magnetic base capable of sliding and standing on a magnetic plane for sticky notes according to claim 1, characterized in that the magnetic base has an open-type rim-free portion.

8. The reusable anti-falling magnetic base capable of sliding and standing on a magnetic plane for sticky notes according to claim 1, characterized in that the sticky notes are matched with the magnetic base for use, and are not used separately.

* * * * *